Figure 4:
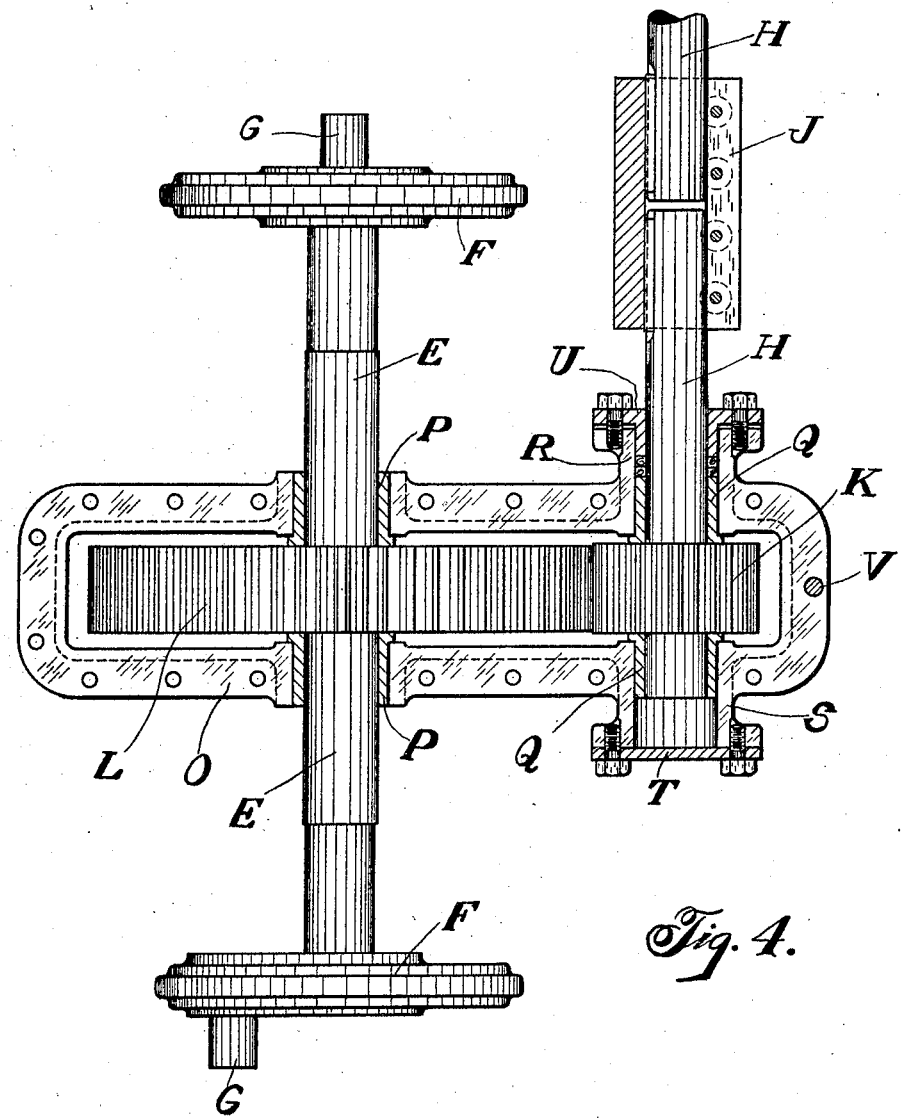

Jan. 15, 1924.  
F. W. PARSONS  
GEAR DRIVE  
Filed Jan. 14, 1922  
1,480,566  
2 Sheets-Sheet 1
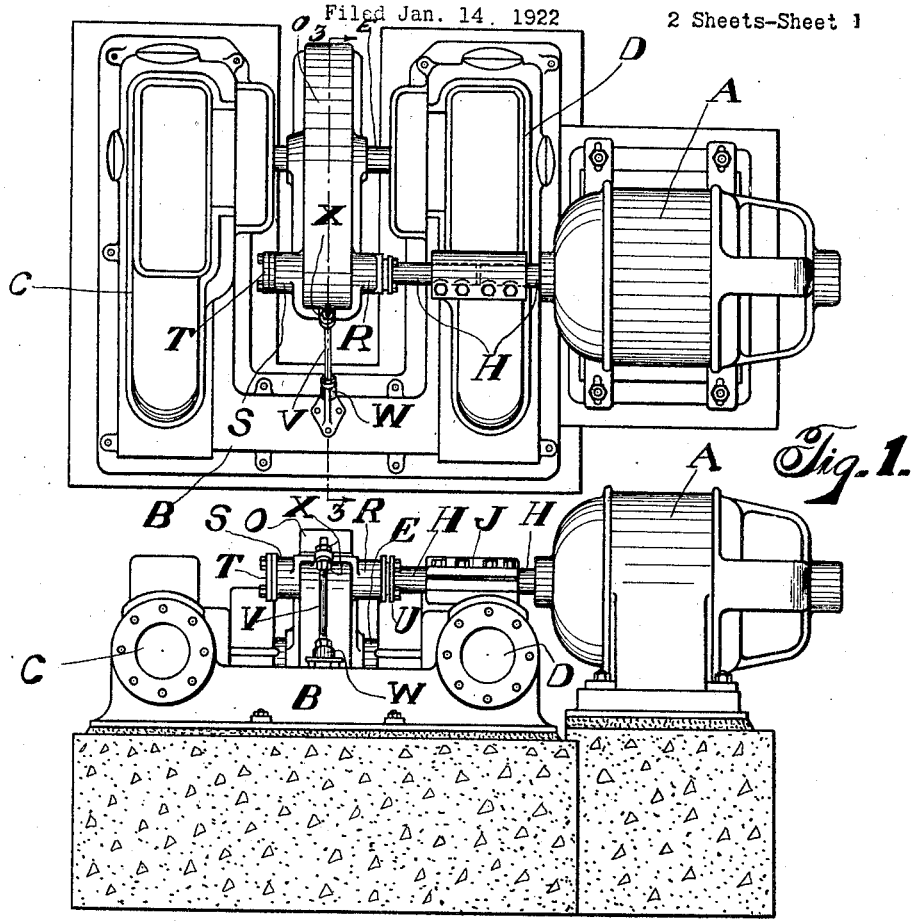
Fig. 1.
Fig. 2.
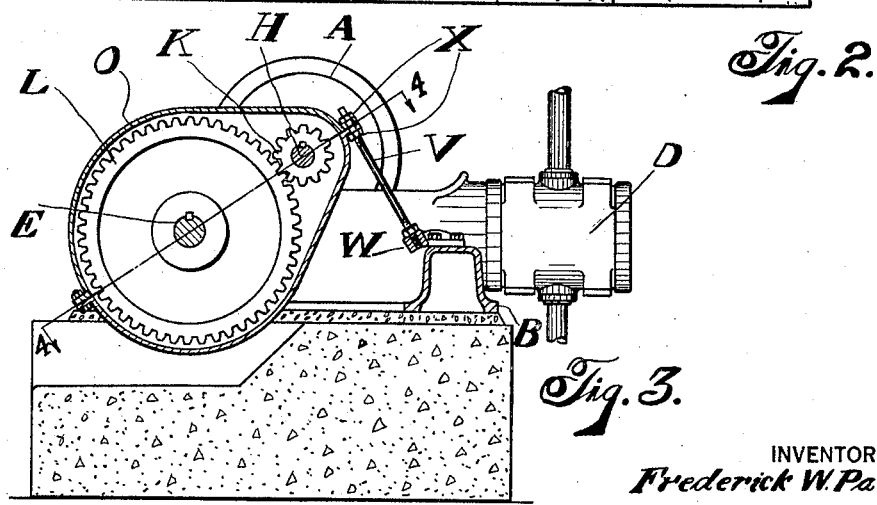
Fig. 3.
INVENTOR  
*Frederick W. Parsons*  
BY  
*Herbert G. Ogden*  
HIS ATTORNEY Patented Jan. 15, 1924.

1,480,566

UNITED STATES PATENT OFFICE.

FREDERICK W. PARSONS, OF ELMIRA, NEW YORK, ASSIGNOR TO INGERSOLL-RAND COMPANY, OF JERSEY CITY, NEW JERSEY, A CORPORATION OF NEW JERSEY.

GEAR DRIVE.

Application filed January 14, 1922. Serial No. 529,284.

*To all whom it may concern:*

Be it known that I, FREDERICK W. PARSONS, a citizen of the United States, and a resident of Elmira, county of Chemung, and State of New York, have invented a certain Gear Drive, of which the following is a specification, accompanied by drawings.

This invention relates to direct connected power driven units and the like, but more particularly to a gear drive for such units or for operatively connecting a driving and a driven shaft in a simple and convenient manner.

The objects of the invention are to improve upon, simplify and cheapen the cost of such gear drives, protect the gearing, reduce vibration, enable the gears to run in oil in an efficient manner and secure improved gear drive which permits ready adjustment of either the driven or driving shaft relatively to the other without disturbing the gearing, gear case or the mesh of the gears.

Further objects will hereinafter appear and the invention is shown in one of its preferred forms in the accompanying drawings, in which—

Figure 1 is a top plan view of a direct connected motor driven compressor unit illustrating the invention, Figure 2 is an end elevation of the unit, Figure 3 is a transverse sectional elevation on the line 3—3 of Figure 1, looking in the direction of the arrows, and Figure 4 is an enlarged detail horizontal sectional view through the crank case on the line 4—4 of Figure 3 looking in the direction of the arrows.

Referring to the drawings, a motor A shown as an electric motor, and a compressor B are shown mounted adjacent each other on suitable foundations and in accordance with my invention, my improved gear drive is provided for driving the compressor directly from the motor.

In this instance, a duplex compressor is shown having the cylinders C and D lying side by side, parallel to each other, and adapted to be driven by a common crank shaft E, having the crank discs F and crank pins G. The motor shaft H, which may be formed in two parts connected by the split coupling sleeve J, preferably extends above the compressor cylinder as indicated in the drawings, and substantially parallel to and forwardly of the crank shaft E, although the motor shaft H may be located at either side of the crank shaft, as desired, depending upon the location of the motor. In the construction shown, the crank shaft E is thus located at one side of the motor shaft, and in a plane below the same.

Any suitable geared connection may be provided between the motor shaft H forming the driving shaft, and the compressor crank shaft E, forming the driven shaft, and in this instance, I have shown a driving pinion K on the motor shaft and a driven gear L on the crank shaft, meshing with the pinion K, and driven thereby.

A gear case O in the form of a longitudinally split housing of substantially the shape indicated in the drawing, encloses the gear L and the pinion K and is supported upon the driven shaft E on suitable bearings at each side of the gear, and by the distance piece V secured to the frame of the unit. Bearing sleeves P are preferably provided for the gear case on the crank shaft E, and at each side of the gear L, and bearing sleeves Q are similarly provided on the motor shaft H at each side of the driving pinion K. The upper end of the gear case O is preferably provided with outwardly extending bearing housings R and S and in this instance, a cover T is provided for the housing S, and a gland U is provided for the housing R, in order to better seal this portion of the gear case. The outer end of the driving shaft H has two bearings in the gear case, one on either side of the pinion, and is supported by the gear case. The gear case is adapted to be filled with oil, so that the gear and pinion may run in oil.

In order to counteract the torque and maintain gear alignment the distance piece, in the form of a rod V, is suitably secured at the point W to a stationary portion of the compressor frame and adjustably connected at its outer end to the upper end of the crank case, as by means of the adjusting nuts X.

Since the gear case O may pivot or swing to a limited degree, around either one of the shafts, as an axis, it is obvious that either one of the said shafts may be adjusted relatively to the other without disturbing the gear drive or the mesh of the gear and pinion, or other gears which may be chosen to form the gear drive. By this means, the shafts may be readily aligned or angularly adjusted, as desired. In case of wear on the bearings of the shafts, these may be renewed or adjusted without disturbing the gear drive.

My improved gear drive has been found to operate satisfactorily and in an efficient manner, with reduced vibration and adjustment of the shafts have been made readily and quickly, as herein described.

I claim:

In a gear drive for direct connected power driven units and the like, the combination of a driving shaft supported at one end in stationary bearings, the outer end of the shaft being overhung beyond the bearings, a pinion on the outer end of the driving shaft, bearing sleeves on the driving shaft at each side of said pinion, a driven shaft extending parallel to the driving shaft, a gear on the driven shaft meshing with said pinion, bearing sleeves on the driven shaft at each side of said gear, a longitudinally split gear case enclosing said gear and pinion and supported at its larger end by the driven shaft on said bearing sleeves at each side of the gear, the smaller end of the gear case having outwardly extending bearing housings at each side of the pinion, and the bearing sleeves on said driving shaft being carried by said housings, a cap for closing the housing over the outer end of the driving shaft, a gland in the other housing for sealing the housing, and a distance piece supported from a stationary portion of the power unit and adjustably connected to the smaller end of said gear case for supporting the gear case to counteract torque and permit angular adjustment of the driving and driven shafts.

In testimony whereof I have signed this specification.

FREDERICK W. PARSONS.